(12) United States Patent
Johannessen

(10) Patent No.: US 10,185,049 B2
(45) Date of Patent: Jan. 22, 2019

(54) ELECTRO-MAGNETIC ANTENNA FOR WIRELESS COMMUNICATION AND INTER-WELL ELECTRO-MAGNETIC CHARACTERIZATION IN HYDROCARBON PRODUCTION WELLS

(75) Inventor: Kjetil Johannessen, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 487 days.

(21) Appl. No.: 13/984,759

(22) PCT Filed: Feb. 11, 2011

(86) PCT No.: PCT/EP2011/052063
§ 371 (c)(1),
(2), (4) Date: Aug. 30, 2013

(87) PCT Pub. No.: WO2012/107107
PCT Pub. Date: Aug. 16, 2012

(65) Prior Publication Data
US 2013/0328692 A1 Dec. 12, 2013

(51) Int. Cl.
*G01V 3/30* (2006.01)
*G01V 3/34* (2006.01)
(Continued)

(52) U.S. Cl.
CPC .............. *G01V 3/30* (2013.01); *E21B 47/122* (2013.01); *G01V 3/12* (2013.01); *H01Q 1/04* (2013.01); *H01Q 9/16* (2013.01)

(58) Field of Classification Search
CPC ......... E21B 47/122; E21B 47/12; G01V 3/18; G01V 3/30
(Continued)

(56) References Cited

U.S. PATENT DOCUMENTS 2,354,887 A    8/1944  Silverman et al.
4,578,675 A *  3/1986  MacLeod .............. E21B 17/003
                                                   166/66
(Continued)

FOREIGN PATENT DOCUMENTS

WO    WO 02/12676 A1    2/2002
WO    WO 2007/004891 A1 1/2007

*Primary Examiner* — Muhammad N Edun
*Assistant Examiner* — Jerold Murphy
(74) *Attorney, Agent, or Firm* — Birch, Stewart, Kolasch & Birch, LLP

(57) ABSTRACT

Methods, a system and antennas are provided for transmitting or receiving signals from a hydrocarbon production well. The well comprises a well bore formed in a formation, a production liner/tubing extending axially along the well bore, and an inductive coupling disposed around the liner/tubing. The liner tubing is electrically coupled to the formation at two axially separated locations and is electrically isolated from the formation between the locations. For transmitting, an alternating current signal to the inductive coupling to induce a current in the liner/tubing, the liner tubing forming a dipole antenna that generates an electromagnetic radiation signal propagating through the formation. For receiving, the dipole antenna is exposed to an electromagnetic radiation signal propagated through the formation which induces an alternating current signal in the tubing and the current signal is detected at the inductive coupling.

6 Claims, 4 Drawing Sheets

(51) Int. Cl.
  *G01V 3/26* (2006.01)
  *E21B 47/12* (2012.01)
  *G01V 3/12* (2006.01)
  *H01Q 1/04* (2006.01)
  *H01Q 9/16* (2006.01)

(58) Field of Classification Search
  USPC ............... 340/854.4–854.6, 320; 367/81–83; 174/47
  See application file for complete search history.

(56) References Cited

U.S. PATENT DOCUMENTS

| | | | |
|---|---|---|---|
| 4,739,325 A | 4/1988 | MacLeod | |
| 6,150,954 A | 11/2000 | Smith | |
| 6,525,540 B1* | 2/2003 | Kong | G01S 7/03 166/250.01 |
| 2006/0202852 A1* | 9/2006 | Peter | E21B 17/028 340/854.6 |
| 2011/0083855 A1* | 4/2011 | Wygnanski | E21B 43/123 166/372 |

* cited by examiner

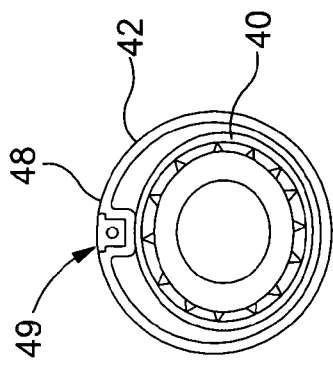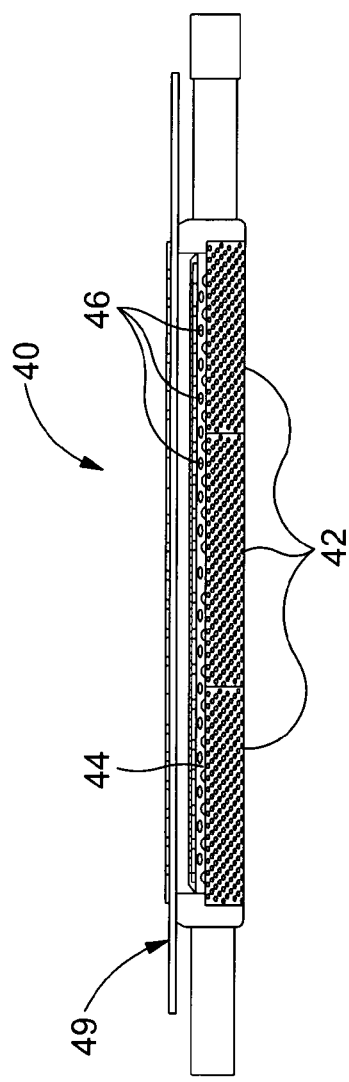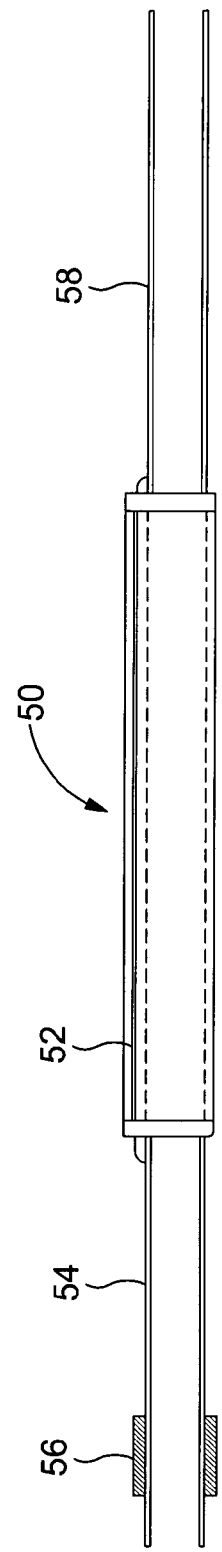

ELECTRO-MAGNETIC ANTENNA FOR WIRELESS COMMUNICATION AND INTER-WELL ELECTRO-MAGNETIC CHARACTERIZATION IN HYDROCARBON PRODUCTION WELLS

FIELD OF THE INVENTION

The present invention relates to an improved electro-magnetic antenna for use in hydrocarbon production wells.

BACKGROUND

A variety of technologies have been developed for transmitting power and or signals (such as data signals from sensors) to/from deep underground in hydrocarbon production wells. The use of advanced extraction technologies, such as Multi-lateral wells and Through Tubing Rotary Drilling (TTRD) increases access to hydrocarbon reserves through existing well completions by drilling new sidetracks branching off the existing production tubing. The distances involved in these well branches can extend to many kilometers. This poses significant problems for installing signal and power transmission systems. Most current systems are based on wired power supply from surface. However, the cables in cable systems are especially vulnerable to damage, and there are difficulties in making the cable connections inside the well.

Other techniques include inductive coupling with the use of coupled loop antennas. Another such technology, which is described in WO2007/004891, involves the use of "current transformers" or inductive couplers to induce a current onto the production tubing and pick it up again from the tubing. However, existing inductive coupling technologies have a major problem if there is a short circuit between the inside of the tubing and the annulus fluid along a long length of transmission. Another problem with this type of system is that sending a signal up the tubing to a receiver at the wellhead often requires the use of many repeaters. Repeaters add to the complexity and installation cost, as well as limiting access to the well bore. Indeed, a major drawback with a current transformer is that it requires a substantial mass of inductive material as well as a large number of windings on the secondary coil and/or a relatively high frequency to effectively pass a reasonable amount of power.

There is also a trend in new oil fields to have many well branches that finger out into the reservoir from one or several mother wells. These well patterns can benefit from the use of electromagnetic techniques to determine properties including hydrocarbon saturation in-between the branches, so an effective, or improved method to radiate and receive electromagnetic waves is attractive.

SUMMARY

The present invention is based on the concept of transmitting an electromagnetic (EM) signal at a location down a well bore and picking up the signal from the radiated EM field at another location (e.g. at the surface, or seabed for offshore production). The existing technologies (some of which are discussed above) make it possible to provide sufficient power down a well to transmit a powerful electromagnetic (EM) signal on an antenna. The power may be provided from the surface and fed via cables or other power transmission technologies, or provided locally in the well from batteries or generators. The generation of EM radiation from a location down a well has hitherto been based on providing a wire within the tubing contacting the tubing at two points so that the tubing itself acts as a dipole antenna. EM radiation is also used for surveying the formation (i.e. rock, sand, etc through which the well is drilled) but in these cases the EM fields applied to the formation have been based on power feeds via cables from the surface and then typically transmitted into the formation by point contacts, usually in open hole (i.e. no casing in the well bore) during formation logging.

References herein to tubing, production tubing and liner tubing should not be taken as references to any one particular type or location in a well completion. Generally, where the well has a casing lining the bore, then the common terminology will be a "tubing" or "production tubing" running inside the well bore with an annular space between the tubing and the casing. However where there is no casing, as is typical in the lower parts of a well, then the terminology will usually be a "liner" or "production liner".

According to a first aspect of the present invention there is provided a method of transmitting signals from a hydrocarbon production well. The well comprises a well bore formed in a formation, a production liner/tubing extending axially along the well bore, and an inductive coupling disposed around the liner/tubing. The liner tubing is electrically coupled to the formation at two axially separated locations and is electrically isolated from the formation between the locations. The method comprises providing an alternating current signal to the inductive coupling to induce a current in the liner/tubing, the liner tubing forming a dipole antenna that generates an electromagnetic radiation signal propagating through the formation.

According to a second aspect of the present invention there is provided a method of receiving signals in a hydrocarbon production well. The well comprises a well bore formed in a formation, a production liner/tubing extending axially along the well bore, and an inductive coupling disposed around the liner/tubing. The liner tubing is electrically coupled to the formation at two axially separated locations and is electrically isolated from the formation between said locations, the liner tubing forming a dipole antenna. The method comprises: exposing the dipole antenna to an electromagnetic radiation signal propagated through the formation so as to induce an alternating current signal in the tubing; and detecting the current signal at the inductive coupling.

Thus, the electrically isolated length of tubing acts as a dipole antenna when current is induced in the tubing by the inductive coupling or electromagnetic radiation. An example of such an inductive coupling or "current transformer" is described in WO2007/004891 and essentially comprises a closed loop of inductive core material that encloses the tubing. A number of windings are applied around the core material at the secondary windings. The setup also transforms impedance so a high number of windings can generate a match to a very low impedance of the tubing. Thus, instead of providing a wire within the tubing contacting the tubing at two points as described above, the invention merely requires an inductive coupling to induce a current in the isolated length of tubing. Because each end of the isolated length of tubing has an electrical connection to the formation, there is a return current path through the formation. The longer the isolated section (i.e. the further apart the connections to the formation) the longer the antenna and the greater the field strength of the antenna as long as the antenna is shorter than half the electromagnetic wavelength in the formation.

The method may further comprise receiving or transmitting the electromagnetic radiation signal at an antenna disposed proximate the surface of the formation.

The method may further comprise adding a length of liner/tubing to extend the length of the antenna between the axially separated locations. The length of liner tubing may be added for improving impedance matching of the dipole antenna.

The current signal may be generated from a power signal provided to the inductive coupling by an induced current transmission arrangement comprising a pair of matched inductive couplings. Alternatively, the current signal may be generated from a power signal provided to the inductive coupling via a cable. The power signal may be provided at a first frequency and the method may include converting the frequency to a second, lower frequency for generating a lower frequency of the electromagnetic radiation signal propagated in the formation.

The inductive coupling may be located on a screened length of the liner/tubing between adjacent screen sections.

According to a third aspect of the present invention there is provided a system for transmitting signals in a hydrocarbon production well installation that comprises a well bore formed in a formation and a production liner/tubing extending axially along the well bore. A first antenna is formed of a first length of the liner/tubing which is electrically coupled to the formation at two axially separated locations and is electrically isolated from the formation between the locations. An inductive coupling is disposed around the first length of liner/tubing, and an ac signal generator provides a signal to the inductive coupling. A second antenna receives an electromagnetic radiation signal propagating through the formation and generated by the first antenna.

The first antenna may be located in a well branch. The second antenna may be disposed proximate an upper surface of the formation. The upper surface of the formation may be a seabed.

The second antenna may be an electric dipole antenna, a magnetometer antenna or any form of antenna suitable for use with electromagnetic signals having frequencies below 10 kHz. The second antenna may be formed of a second length of liner tubing in a well bore, the second length of liner tubing being electrically coupled to the formation at two additional axially separated locations and electrically isolated from the formation between the additional locations.

The system may comprise a plurality of first antennas disposed at a plurality of locations in one or more hydrocarbon production wells.

According to a fourth aspect of the invention there is provided an antenna for use in a hydrocarbon production well installation. The well comprises a well bore formed in a formation, a production liner/tubing extending axially along the well bore. The antenna comprises a length of the liner/tubing with electrical couplings to the formation at two axially separated locations, the length of liner tubing being electrically isolated from the formation between said locations. An inductive coupling is disposed around the first length of liner/tubing. An ac signal generator provides a signal to the inductive coupling to induce a current in the liner tubing, the liner/tubing forming a dipole antenna for generating an electromagnetic radiation signal propagating through the formation.

According to a fifth aspect of the invention there is provided an antenna for use in a hydrocarbon production well installation. The well comprises a well bore formed in a formation, a production liner/tubing extending axially along the well bore. The antenna comprises a length of the liner/tubing with electrical couplings to the formation at two axially separated locations, the length of liner/tubing being electrically isolated from the formation between the locations. An inductive coupling is disposed around the first length of liner/tubing. A receiver detects a current signal induced in the inductive coupling as a result of a current induced in the tubing as a result of exposure of the antenna to an electromagnetic radiation signal propagated through the formation.

In embodiments of the fourth or fifth aspects, the liner/tubing may be located in a well branch. The inductive coupling may be located on a screened length of the liner/tubing between adjacent screen sections. The antenna may further comprise an induced current transmission arrangement comprising a pair of matched inductive couplings for supplying an ac power signal to the first antenna. The antenna may further comprise a frequency converter for converting the frequency of the ac power signal to a lower frequency for the signal generator. The frequency converter may comprise a switched capacitor arrangement. The antenna may further comprise a cable for supplying a power signal to the antenna. The antenna may further comprise a cable for bypassing a section of liner/tubing that has a large surface area exposure, to extend the length of the first antenna beyond the section. The section of liner/tubing may comprise one or more screened lengths, an insulated conducting cable connecting the tubing either side of the screened lengths. The screened length of liner/tubing may comprise screens having grooves therein to accommodate the cable. The length of liner/tubing may be coated with an electrical insulation material.

BRIEF DESCRIPTION OF THE DRAWINGS

FIGS. 7a and 7b show, in elevation and cross section respectively, a screened section of a production liner tubing.

FIG. 8 shows an embodiment that includes a screened and unscreened sections of a production liner tubing forming part of an antenna.

Referring to FIG. 1, a length of tubing 10, for example a length of production liner or tubing, has an inductive coupling or "current transformer" 12 wrapped around the tubing 10 and an adjacent current signal generating unit 14. When a current signal is supplied to the inductive coupling 12 this induces a current in the tubing 10, as indicated by the arrows 16. Depending on the surroundings of the tubing 10 (electrical conductivity, contact resistance etc.) a return current path may flow as indicated by the arrows 18. This results in an electromagnetic field, which is propagated through the surroundings. Thus, the tubing acts as a dipole antenna. Clearly the strength of the generated electromagnetic radiation will depend on numerous factors, including the material properties of the tubing and surroundings as well as the strength of the current signal applied to the inductive coupling 12. As shown by the relative sizes of the arrows 16, the strength of the induced current decays with distance along the tube from the inductive coupling 12, thereby limiting the effective length of the antenna. The principle is reversed when the unit is working as a receiver where instead of a generating unit 14 there is a signal receiving unit. It is also possible to induce a component of a magnetic field in the tubing by arranging loops of the inductive coupling in a particular manner, and this may be helpful for modifying the antenna characteristics slightly.

FIG. 2 illustrates how the principle shown in FIG. 1 may be used to greater effect in a hydrocarbon production well. Equivalent features to those shown in FIG. 1 have the same reference numerals. The production liner tubing 10 is isolated from the surroundings along its length, with electrical contact to the surroundings only at each end 20, 22. For example, if the liner tubing 10 is installed inside a well bore or side track, then it would be necessary to ensure that there is no electrical contact, or at least good insulation, between the tubing 10 and the well bore along the length of the tubing 10. This ensures that there is no current leakage from the tubing 10 to the formation along the length of the tubing 10. As a consequence the length of the dipole antenna is extended, determined by the distance between the ends 20, 22 where there is electrical contact with the formation. A number of measures may be taken to ensure that the tubing is electrically isolated from the surroundings, including use of centralisers to ensure adequate spacing between the liner tubing 10 and the well bore, or use of insulation materials to coat the outside of the tubing 10.

In applications involving a hydrocarbon well down-hole wireless gauge or sensor system, the telemetry is the most energy consuming part. Therefore, to use the production liner tubing as an antenna it would be preferable to lengthen the effective dipole because, for example, lengthening the dipole by a factor of 4 improves the range much more than increasing the transmitted power by a factor of 4. Until the parasitic resistance in the system starts to dominate or the electromagnetic half wavelength is approached, elongating the dipole is an effective means of improving overall system performance and reducing power consumption. If power to the system is based primarily on local batteries, this will extend the life of the sensor system or allow for more data to be transmitted. If power is provided from an energy generator, the ability to operate at lower power eases the physical and electrical requirements for the energy generation system. This advantage results in a combination of reduced pressure drop (as a result of smaller sized equipment in the well), usable flow range and reduced wear at the power generator.

Figure 1:
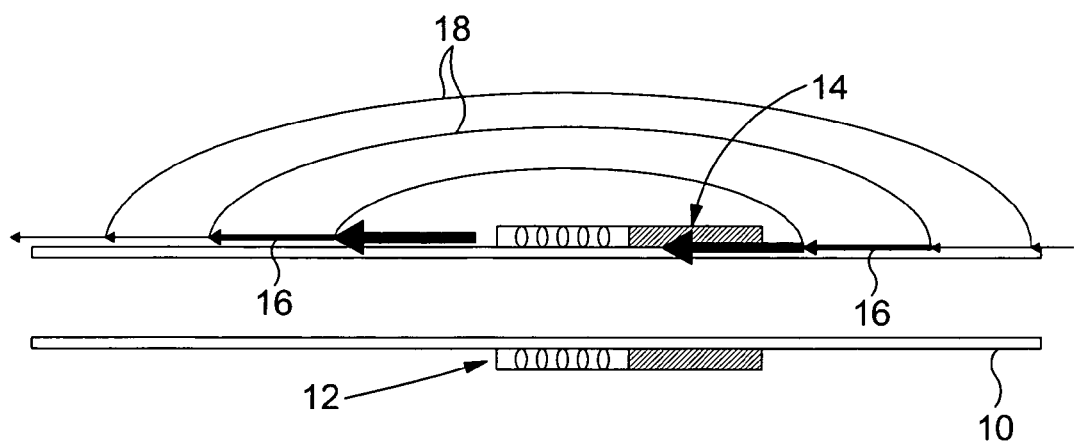
FIG. 1 is an illustration showing current paths for a current induced in a production liner tubing by an inductive coupling.
Figure 2:
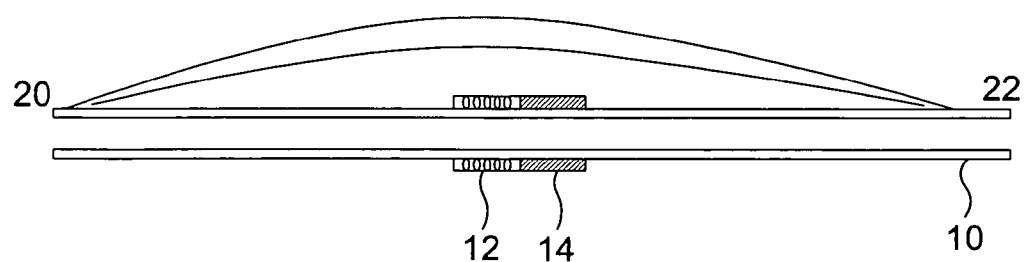
FIG. 2 illustrates an antenna embodiment in accordance with the principles of the present invention.
Figure 3:
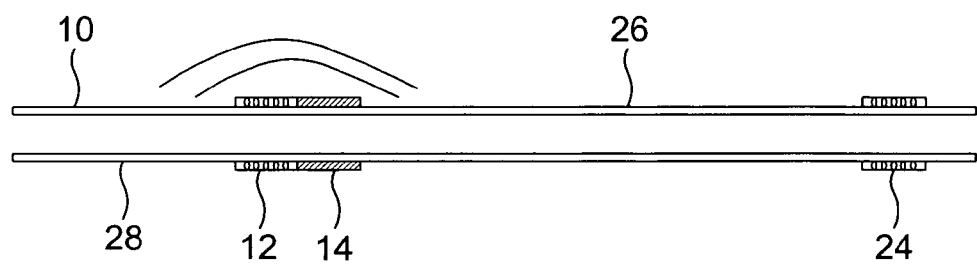
FIG. 3 illustrates one embodiment of an antenna arrangement with a production liner tubing and inductive couplings.

FIG. 3 illustrates an alternative way of providing the current signal to the inductive coupling 12. Equivalent features to those shown in FIGS. 1 and 2 have the same reference numerals. A second inductive coupling or "current transformer" 24 is used to transmit the current signals to the inductive coupling 12 using the signal transmission capabilities of this inductive coupling technology, as described, for example, in WO2007/004891. As shown in FIG. 3, only a first length 26 of the production tubing 10 extending from the second inductive coupling 24 is isolated, while a second length 28 of the tubing 10 in the vicinity of the inductive coupling 12 is not so isolated. Thus, in this case, the antenna is similar to that shown in FIG. 1 and is of limited length. However, the power induced in the tubing by the inductive coupler 12 can be split from the effective antenna. This can done in various different ways, one such being illustrated in FIG. 3, where the inductive coupler 12 feeds much of its energy locally into the formation through the contact with the formation at the un-insulated length of tubing 28. A part of the current induced can still be retained on the tubing 28 through the insulated first length 26 to feed power and/or signals to the second inductive coupler 24.

Figure 4:
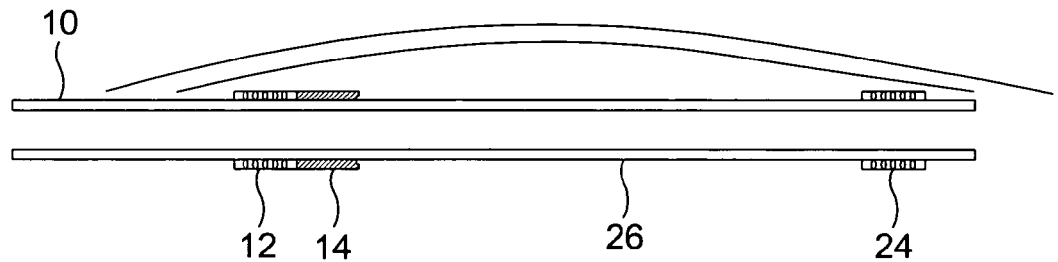
FIG. 4 illustrates another embodiment of an antenna arrangement with a production liner tubing and inductive couplings.

FIG. 4 illustrates how the arrangement of FIG. 3 can be used effectively as an extended dipole antenna. Equivalent features to those shown in FIGS. 1 to 3 have the same reference numerals. In this case the production liner tubing 10 is isolated all the way between the second inductive coupling 24 and the inductive coupling 12. Thus, the entire length of isolated tubing acts as a dipole antenna as described above. However, the power to drive the antenna is provided from a remote source via the pair of inductive couplings 12, 24. In this case the radiated energy will be at the same frequency as the current induced in the tubing. The current signal generator 14 could include a frequency converter (as will be described in more detail below with reference to FIGS. 5 and 6), for providing a lower frequency current signal to the inductive coupling 12 to drive the antenna.

This arrangement can also be used to reduce the required volume of the transmitter system, which is especially important where the antenna is to be operated at very low frequencies e.g. 10 Hz or lower. Propagation losses for an electromagnetic wave in the formation increase with the frequency. Hence, it is important for long reaching applications to be able to emit and receive very low frequencies. Thus, the current signal can be transmitted between the two inductive couplings 12, 24 that form a matched pair, so that both couplings induce the same current signal in the tubing 10 at their respective locations. This also enables the effective length of the antenna to be extended without the resistance of the tubing 10 reducing the efficiency of the antenna too much.

The length of the antenna can be extended by adding sections of isolated tubing to the total length (including, if necessary use of centralisers and conductive connections between the tubing sections). Adding (or changing) the length of the antenna is also an effective way of improving the impedance matching of the antenna. The impedance of the antenna includes all the characteristics of the tubing acting as an antenna, including capacitive and inductive parts of the tubing itself and the impedance transformation taking place in the inductive couplers. Thus, adding a length of tubing can be used for improving the impedance matching using the resistance of the path length in the tubing and formation as a matching parameter. Good impedance matching is important for the efficiency of the EM transmission.

Figure 5:
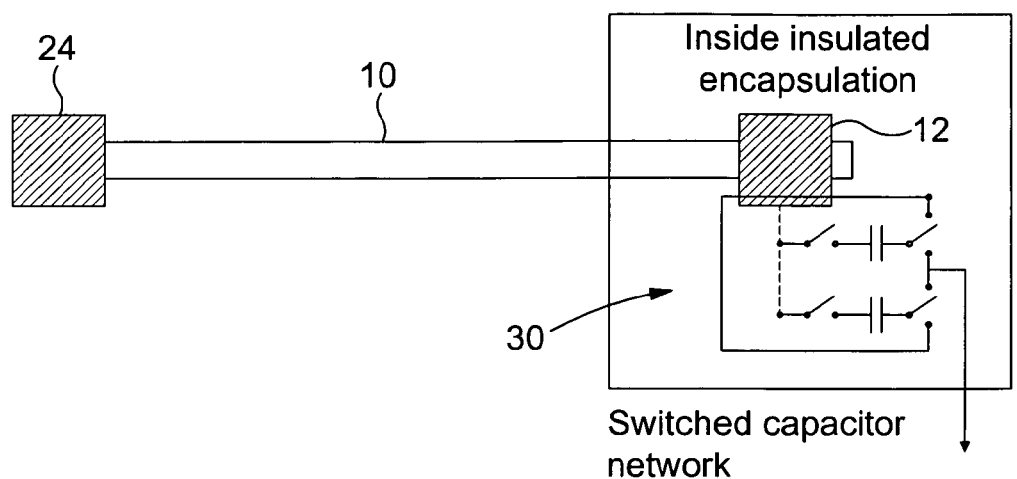
FIG. 5 illustrates in schematic form a switched capacitor circuit for frequency conversion of a current signal transmitted on a pipe.
Figure 6:
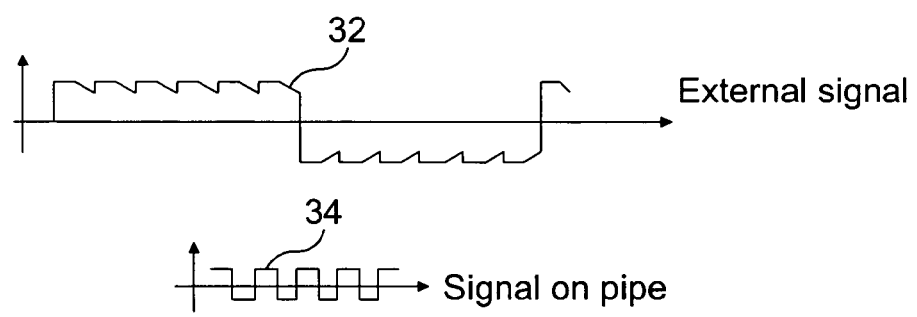
FIG. 6 is a graph showing the conversion of a signal by the circuit of FIG. 5.

If required the transmission between the two matched inductive couplings 12, 24 can be rectified and/or undergo a frequency conversion. For example, simple circuitry involving a set of capacitors (or even batteries) could be used to down-convert the frequency. FIG. 5 illustrates an example of a simple switched capacitor circuit 30 that could be included in the inductive coupling assembly mounted to the tubing 10. This circuit 30 effectively acts as a charge pump (or switched capacitor) type of power supply, but with a fixed turn down ratio as the frequencies are so low. For example, the inductive couplings might operate at 100 Hz while the external dipole antenna circuit operates at 10 Hz. As the frequency is very low, this does not place undue stresses on the switching components. FIG. 6 illustrates the signal 32 external to both the circuit 30 and tubing 10 corresponding to the square wave signal 34 on the tubing 10. Operating with the current induced in the tubing at a higher frequency would allow the volume of the magnetic components and windings to be physically smaller. This generally results from magnetic saturation in the magnetic core material and is an important consideration for keeping the dimensions of the inductive coupler small. Thus there will be a trade off between propagation loss and reduction of magnetic material when determining the frequency and size of the inductive couplers.

When the antenna is to be used as a receiver, the second inductive coupling 24 can be switched out (bypassed) because the level of the received signal will not represent a problem for the transformer magnetization saturation.

FIGS. 7a and 7b illustrate a screened section of a production liner tubing. Screened sections are used at locations where hydrocarbons enter the production liner tubing, and where it is required to prevent too much solid matter from being extracted with the hydrocarbon. As shown the screened section 40 of tubing includes a series of cylindrical screens 42 of mesh that surround a section of the liner tubing 44 with holes 46 through which the hydrocarbons enter the tubing. Some screen designs, such as those shown in FIGS. 7a and 7b include a groove 48 along which a cable 49 can run. Screened sections, such as that shown in FIGS. 7a and 7b, are difficult to isolate from the formation and so increase the likelihood of current leakage. Unlike a cemented liner, screens in an 'open hole' well bore do not get partly insulated by the cement. Also the surface area is larger and they typically have a higher ratio of resistance along the pipe to parasitic resistance to the formation than unscreened sections of tube. Therefore, in the embodiment shown in FIG. 8, a screened section 50 of tubing can be by-passed in an antenna by connecting a high conductivity insulated cable 52 that links a section of liner tubing 54, in which a current is induced by an inductive coupling 56, with another section of tubing 58 on the other side of the screened section 50. In this case it would be beneficial for the individual screens to be electrically isolated from each other. This could be done using a composite pup-joint as an electrical isolation. Even if the screen section is not bypassed with the high conductivity cable, isolating the screens would help to reduce current leakage from the tubing and improve the dipole length.

When used in a typical installation, for example in the horizontal section of a branched well, the inductive coupling 12 could be constructed to be mounted to the tubing so as to fit between screens. For example, on a 6⅝ liner between 6⅝ screen sections, this would leave about 10 to 15 mm on the radius for the core and coil of the inductive coupling/current transformer. Also, a short section of smaller diameter tubing could be used for the location of the inductive coupling 12. The rest of the associated electronics (and, for example, the batteries if the antenna is to be powered with a local signal generator) may require some more space. Depending on the requirements for access to the well below, this could be mounted locally inside the liner tubing without presenting too great a restriction or generating too high a pressure drop for the production fluids.

When used for telemetry, the overall system involves transmitting signals for the antenna, formed of a length of production liner tubing in the well, and this is received at a corresponding receiving antenna. The receiving antenna (not shown in the drawings) is located at an upper surface of the formation, which could be at ground level (for wells on land) or at the sea bed (for offshore wells). The receiving antenna could be an electric dipole antenna, a magnetometer antenna or any other suitable form of antenna. It is envisaged that most applications would operate at very low frequencies, and so the receiving antenna would ideally be of a type suitable for receiving electromagnetic signals having frequencies below 10 kHz. Alternatively, the receiving antenna could be another antenna formed of a second length of liner tubing in a well bore—either in part of the same well as the transmitting antenna or in another well.

The antenna systems described in the embodiments above have generally been described as transmitting antennas, but it will be appreciated that they may equally be employed as receiving antennas, utilising many of the same principles discussed above.

The antenna systems described above provide a number of potentially valuable uses. An effective antenna construction enables longer communication distances and opens the possibly of having only one centrally mounted receiver for a complete field. Deployment of receivers on the seabed is very costly.

As already mentioned as well as being used for telemetry, EM radiation is a useful tool for geophysical measurements. Thus the antenna system could also be used at little additional cost to provide information on the water and oil content between well bores in a field. This information can be used to determine options for a field drainage strategy and change a sweep much earlier than any of the current near-well techniques can offer.

The antenna system could also be used as part of a wider system where the antennas in multiple wells are primarily used for communicating to a seabed receiver, but also being integrated as an inter-well EM sensor system.

The invention claimed is:

1. An antenna for use in a hydrocarbon production well installation, wherein the well comprises a well bore formed in a formation, a production liner/tubing extending axially along the well bore, the antenna comprising:
    a first length of the liner/tubing in direct conductive contact with the formation at two axially separated locations, the first length of liner/tubing being electrically isolated from the formation between said locations;
    an inductive coupling disposed around the first length of liner/tubing;
    an ac signal generator for providing a signal to the inductive coupling to induce a current in the liner/tubing, the liner/tubing forming a dipole antenna for generating an electromagnetic radiation signal propagating through the formation; and
    a cable for bypassing a section of liner/tubing that has a large surface area exposure, to extend the length of the first antenna beyond the section,
    wherein an effective length of the dipole antenna is given by a distance between said two axially separated locations.

2. The antenna of claim 1, wherein the section of liner/tubing comprises one or more screened lengths, an insulated conducting cable connecting the tubing either side of the screened lengths.

3. The antenna of claim 2, wherein the screened length of liner/tubing comprises screens having grooves therein to accommodate the cable.

4. An antenna for use in a hydrocarbon production well installation, wherein the well comprises a well bore formed in a formation, a production liner/tubing extending axially along the well bore, the antenna comprising:
    a first length of the liner/tubing in direct conductive contact with the formation at two axially separated locations, the first length of liner/tubing being electrically isolated from the formation between said locations;

an inductive coupling disposed around the first length of liner/tubing;

a receiver for detecting a current signal induced in the inductive coupling as a result of a current induced in the tubing as a result of exposure of the antenna to an electromagnetic radiation signal propagated through the formation; and a cable for bypassing a section of liner/tubing that has a large surface area exposure, to extend the length of the first antenna beyond the section.

5. The antenna of claim 4, wherein the section of liner/tubing comprises one or more screened lengths, an insulated conducting cable connecting the tubing either side of the screened lengths.

6. The antenna of claim 5, wherein the screened length of liner/tubing comprises screens having grooves therein to accommodate the cable.

* * * * *